C. H. VON HOHENSTEIN.
SYSTEM OF IRRIGATION.
APPLICATION FILED OCT. 1, 1910.
986,003.
Patented Mar. 7, 1911.
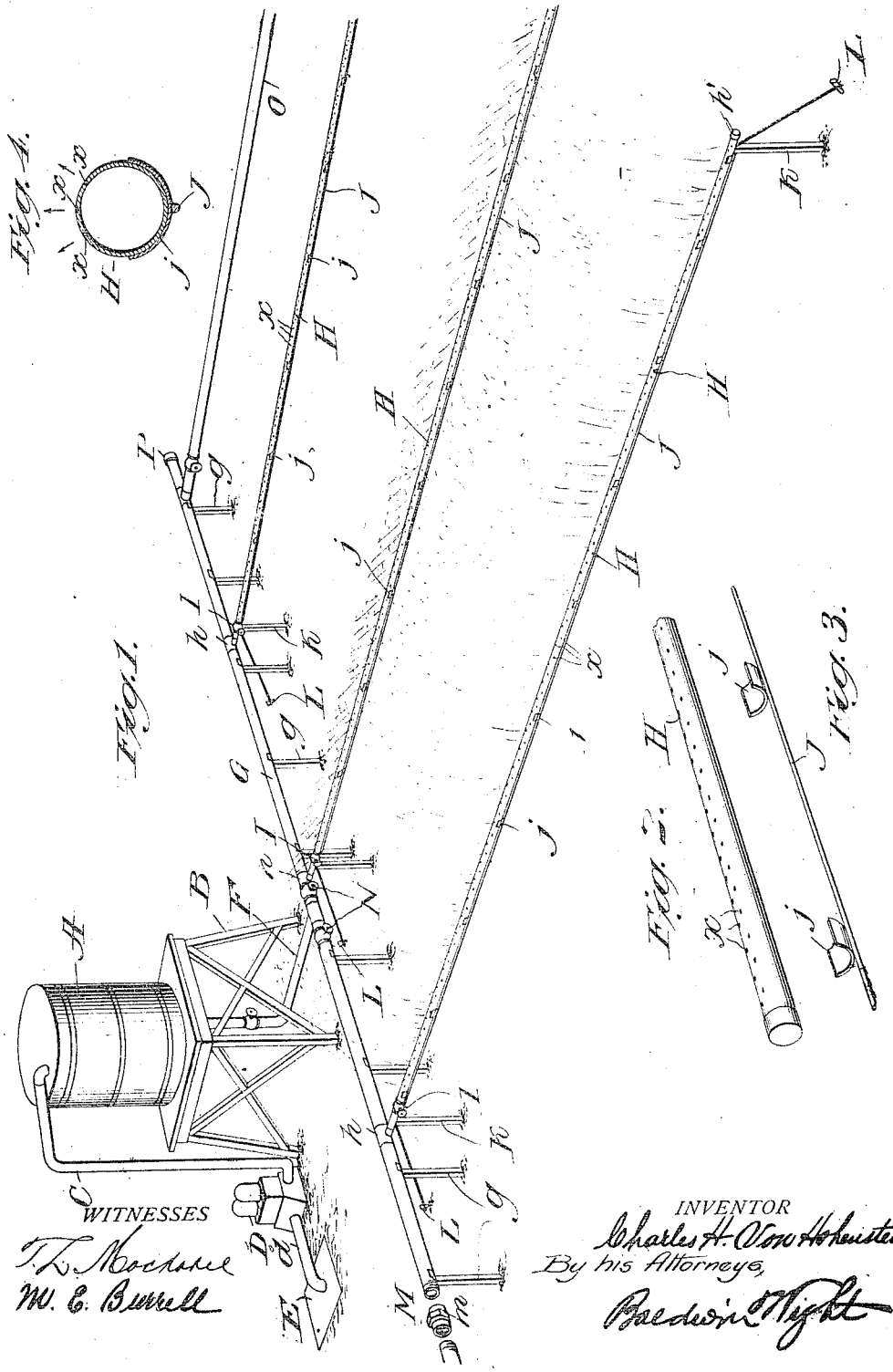
WITNESSES
INVENTOR
Charles H. Von Hohenstein
By his Attorneys,

UNITED STATES PATENT OFFICE.

CHARLES H. VON HOHENSTEIN, OF SAN ANTONIO, TEXAS.

SYSTEM OF IRRIGATION.

986,003.        Specification of Letters Patent.      Patented Mar. 7, 1911.

Application filed October 1, 1910. Serial No. 584,794.

*To all whom it may concern:*

Be it known that I, CHARLES H. VON HOHENSTEIN, a citizen of the United States, residing in San Antonio, in the county of Bexar and State of Texas, have invented certain new and useful Improvements in Systems of Irrigation, of which the following is a specification.

My present invention relates to a system of irrigation in which provision is made for thoroughly irrigating large areas of land in a simple and efficient manner, and the object of my invention is to provide a pipe system which shall completely supply the desired area at a minimum cost of construction.

In carrying out my invention, I connect a main or distributing pipe or feeder with a suitable water supply, such as an elevated tank, and to this feeder I connect any desired number of lateral pipe lines which are formed with perforations on their upper sides to distribute water in fine sprays or clouds on the adjacent land, and I support these pipes on wires provided with brackets or sockets for the pipes and secured at opposite ends to firmly planted posts. The wires are placed under sufficient tension to hold the pipes between two posts located a considerable distance from each other, by which arrangement I save large expense in construction of the plant.

In the accompanying drawings:—Figure 1 is a diagrammatic perspective view, illustrating a system of surface irrigation, organized in accordance with my invention. Fig. 2 is a perspective view of a portion of one of the perforated lateral pipes. Fig. 3 is a perspective view of a section of the pipe-supporting wire provided with brackets or sockets for the perforated pipe. Fig. 4 is a detail view on an enlarged scale and in transverse section through one of the lateral pipes and through its supporting wire and bracket.

Water may be supplied to the system in various ways. In the drawings, I have, for the purpose of illustration, shown a water tank, A, supported on a frame, B, and connected by means of a pipe, C, with a gas engine, D, operating a pump connected at $d$ with a well or other source of supply, E. The tank, A, is connected by a feed pipe, F, with a distributing pipe or feeder, G, and the laterally arranged perforated pipes, H, are connected with the feeder in the manner shown. Preferably the feeder is held at an elevation of something over six feet above the ground, and is supported on posts, $g$, located at suitable distances apart. The lateral pipe lines, H, are connected with the feeder at $h$ by suitable couplings, and each lateral is provided with a valve, I, by means of which it may be disconnected from the feed pipe. Each lateral pipe line is supported in brackets or sockets, $j$, secured to a wire, J. These sockets or brackets may be located suitable distances apart to properly support the pipe and the wire is stretched between two posts, K, which are firmly planted in the ground and are of sufficient size and strength to withstand the strain placed on the wire when it is, by suitable machinery, stretched or put under tension. One end of the wire is anchored in the ground at L after being secured to the adjacent post and the opposite end is anchored, as indicated at L'. The parts of the wires between the anchors L and L' and the tops of the adjacent posts act as guys and assist the posts K at opposite ends of the wire in taking the strain caused by the stretching of the wire and the weight of the pipe. The posts K may be located at opposite ends of a field which may be half a mile or more in width, but when the stretched wire is of this length it is desirable to employ intermediate posts for supporting the wire, but even in such case such intermediate posts may be 150 feet or more from each other. It will be apparent that in this way very simple, efficient and inexpensive means may be provided for supporting the lateral irrigating pipes. As before stated the feeder G is preferably located somewhat more than 6 feet above the ground level in order that workmen may readily pass under it, as may also teams. The lateral perforated pipes will in like manner be elevated a sufficient distance above the ground, say 6 feet or more for the same purpose.

The pipes, H, are made in an inexpensive way. They are constructed of thin sheet metal, properly treated to prevent rusting and may be made in sections of considerable length and wherever necessary joined y suitable couplings or by solder. The perforations, $x$, in the pipes, as indicated in Fig. 4, are so located as to distribute the water thoroughly and in such manner as to produce an artificial drizzling rain upon the surface of the ground.

In the drawings, I have shown three lateral pipe lines, H, but I have indicated at M how the distributing pipe or feeder, G, may be increased in length by coupling devices, m and a larger number of laterals fed from this pipe. Suitable valves are located at N to cut off communication between the water-supply and either side of the feeder, so that any particular part of the land may be irrigated without necessarily irrigating by the entire system of pipes.

Where a very large area of land is to be fed from the water supply, A, I preferably connect with the feed pipe, G, or otherwise connect with the water supply, a pipe, O, which may extend a suitable distance from the feeder, G, and connect with another similar feeder which will supply another set or series of lateral pipes, H. Where a branch feed pipe, such as O is employed, it is preferably located below ground.

I desire to emphasize the fact that the perforations in the lateral pipes should be so formed and located and should be of such size as to throw the water up above the laterals in such manner that it will be atomized and fall to the ground in a form closely resembling a slow, fine, drizzling rain which will sink into the ground uniformly throughout the entire area without flowing off on the surface. In this way the surface of the ground is kept in a loose, pulverulent condition rather than in a hard baked condition as is the case where the soil is watered by heavy sprays.

By a system of irrigation such as described, and such as is indicated in the drawings, intensive farming in arid countries can be most efficiently carried on with but relatively small capital for putting in the plant and with small expense of maintenance which will be more than compensated for by the increased value of the crops gathered on account of sufficient irrigation of the kind described.

The extreme ends of the feeder G may be closed by caps, plugs or other suitable devices, P, and the ends of the lateral perforated pipes, H, may be closed by caps or plugs, $h'$, which may be readily removed when it is desired to clean the pipes should any obstruction occur.

I claim as my invention:—

A system of surface irrigation, comprising a horizontally arranged main feed pipe connected with a water supply, posts on which it is supported at suitable intervals, horizontally arranged parallel perforated distributing pipes connected with the feed pipe at suitable intervals, a horizontally arranged stretched pipe-supporting wire parallel with each distributing pipe, brackets carried by said wire and arranged above them in which the pipe is supported, posts to which said wire is connected and guys connected with the posts and anchored in the ground, substantially as described.

In testimony whereof, I have hereunto subscribed my name.

CHAS. H. VON HOHENSTEIN.

Witnesses:
    LLOYD B. WIGHT,
    N. CURTIS LAMMOND.